March 20, 1934. H. C. MacDOUGALL 1,951,804
PARING DEVICE
Filed Oct. 28, 1930 8 Sheets-Sheet 1

Inventor
Hugh C. MacDougall
By Cameron, Kerkam & Sutton
Attorneys

March 20, 1934. H. C. MacDOUGALL 1,951,804
PARING DEVICE
Filed Oct. 28, 1930 8 Sheets-Sheet 2

Inventor
Hugh C. MacDougall.
Cameron, Kerkam & Sutton
Attorneys

March 20, 1934.  H. C. MacDOUGALL  1,951,804
PARING DEVICE
Filed Oct. 28, 1930    8 Sheets-Sheet 3
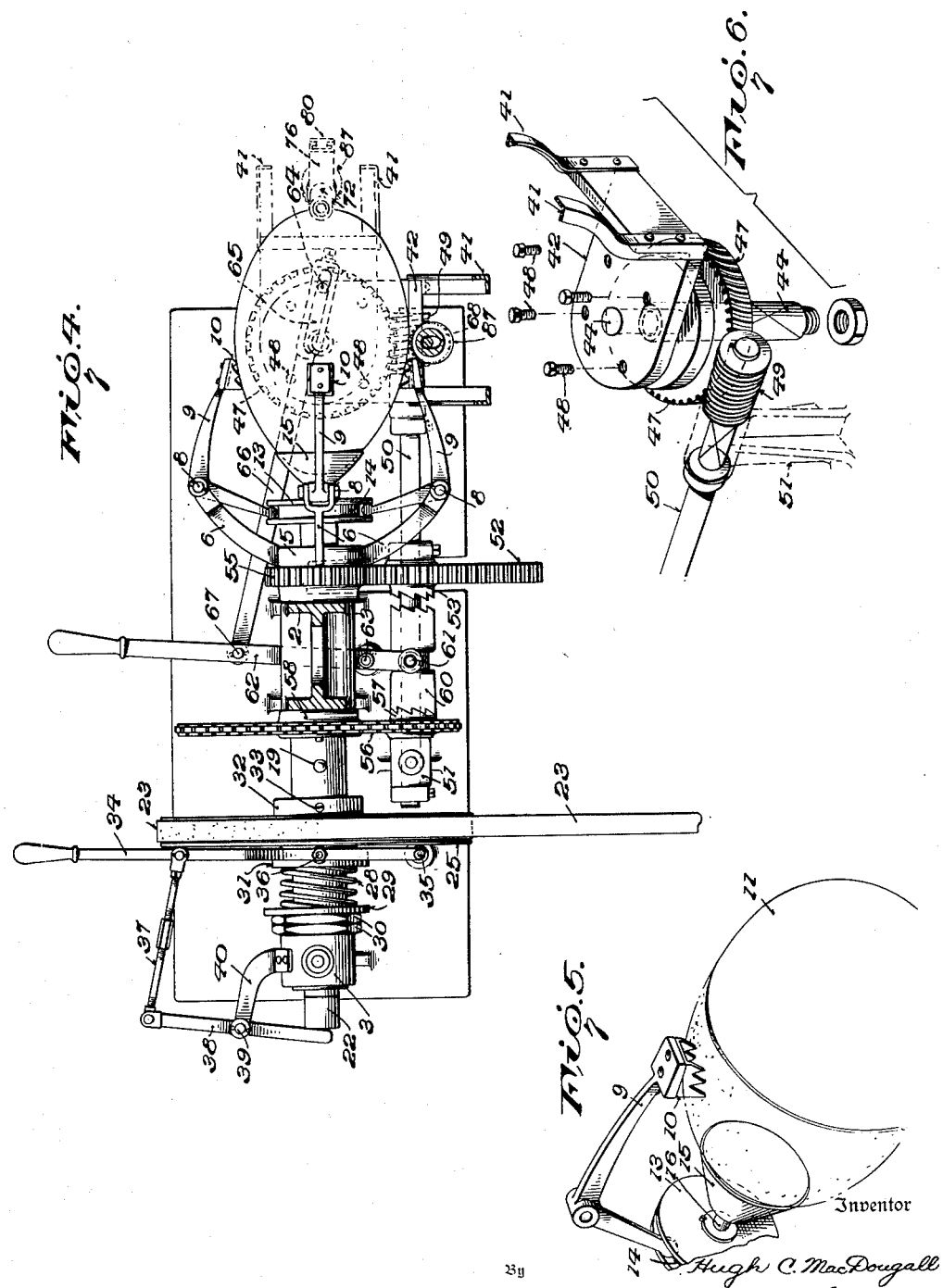
Inventor
Hugh C. MacDougall
By Cameron, Kerkam & Sutton.
Attorneys

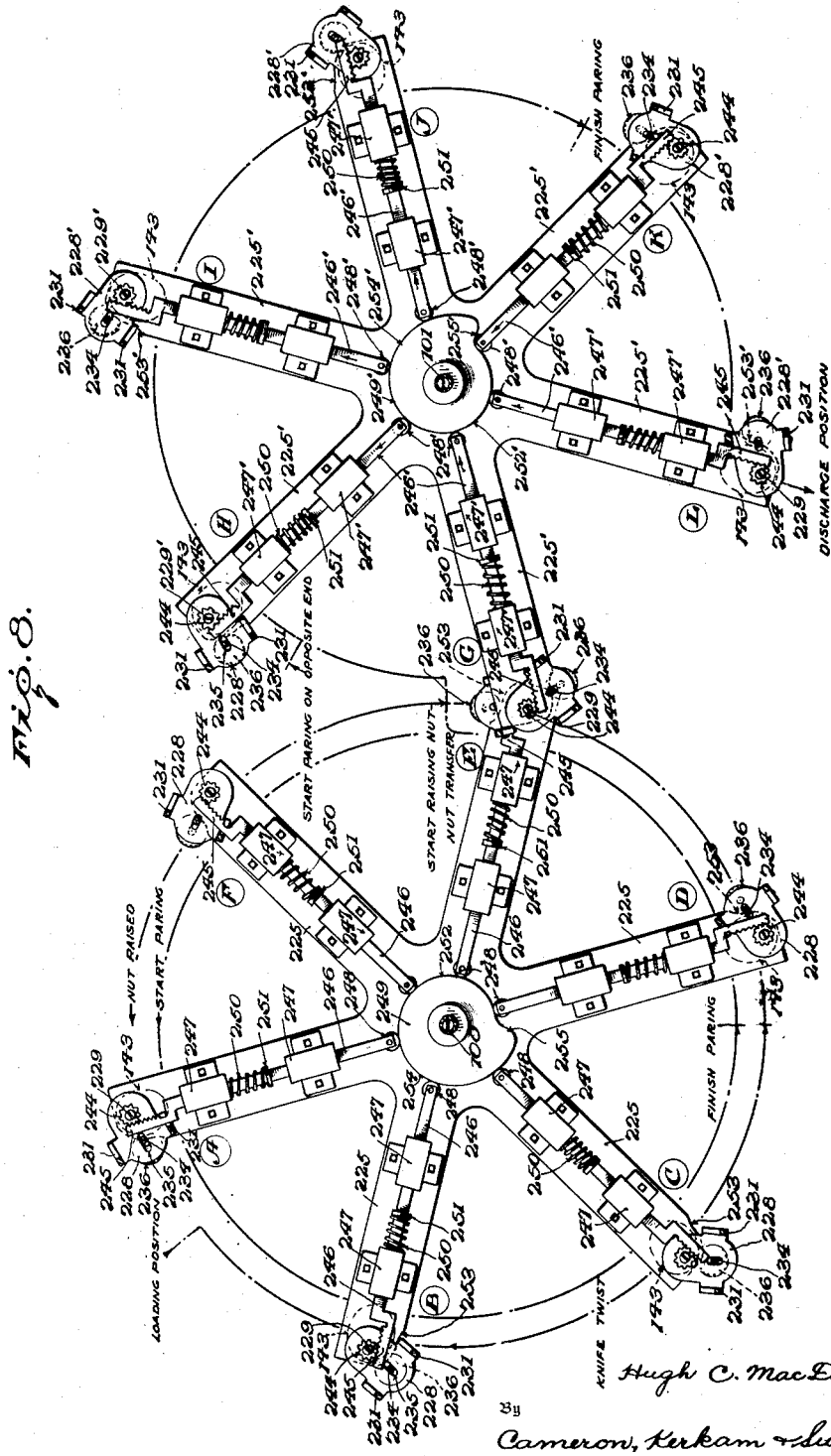

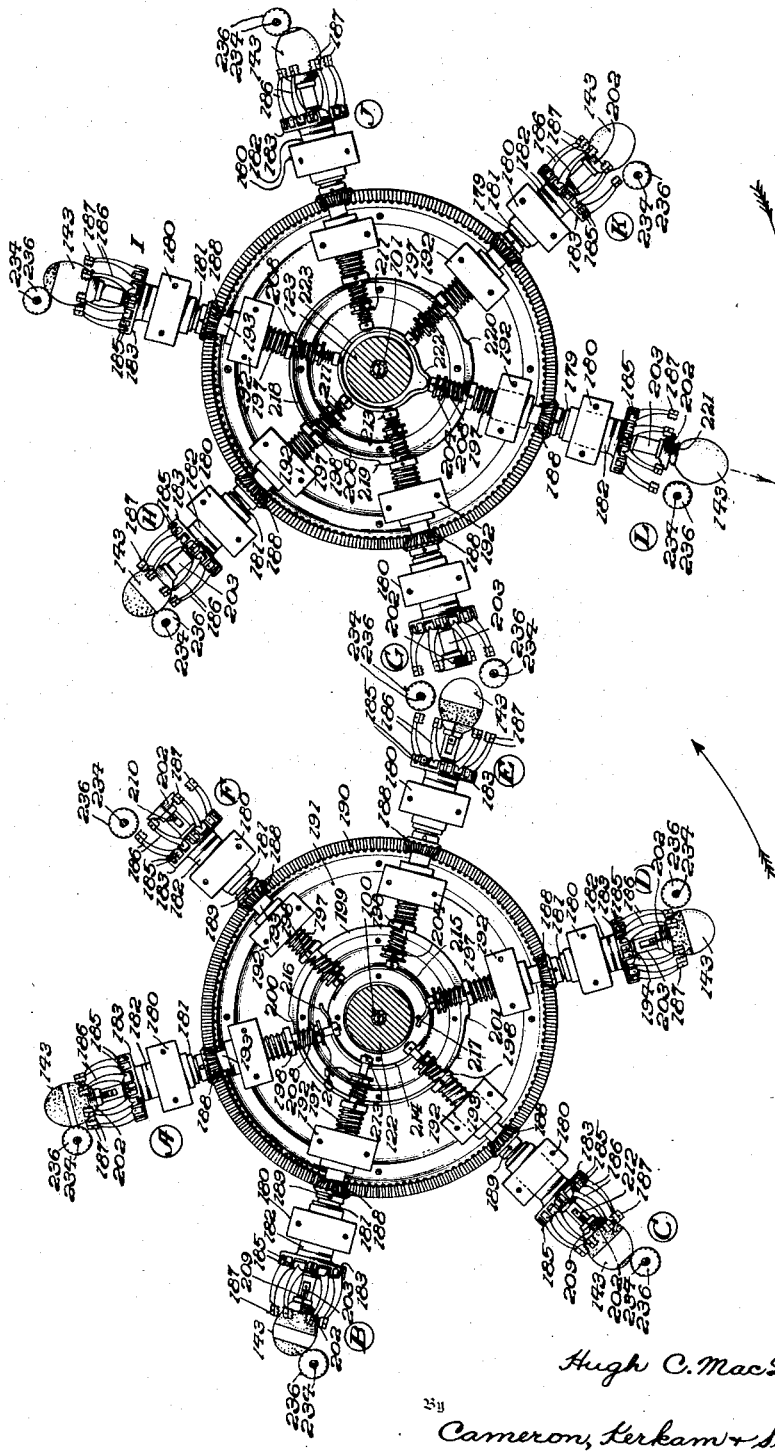

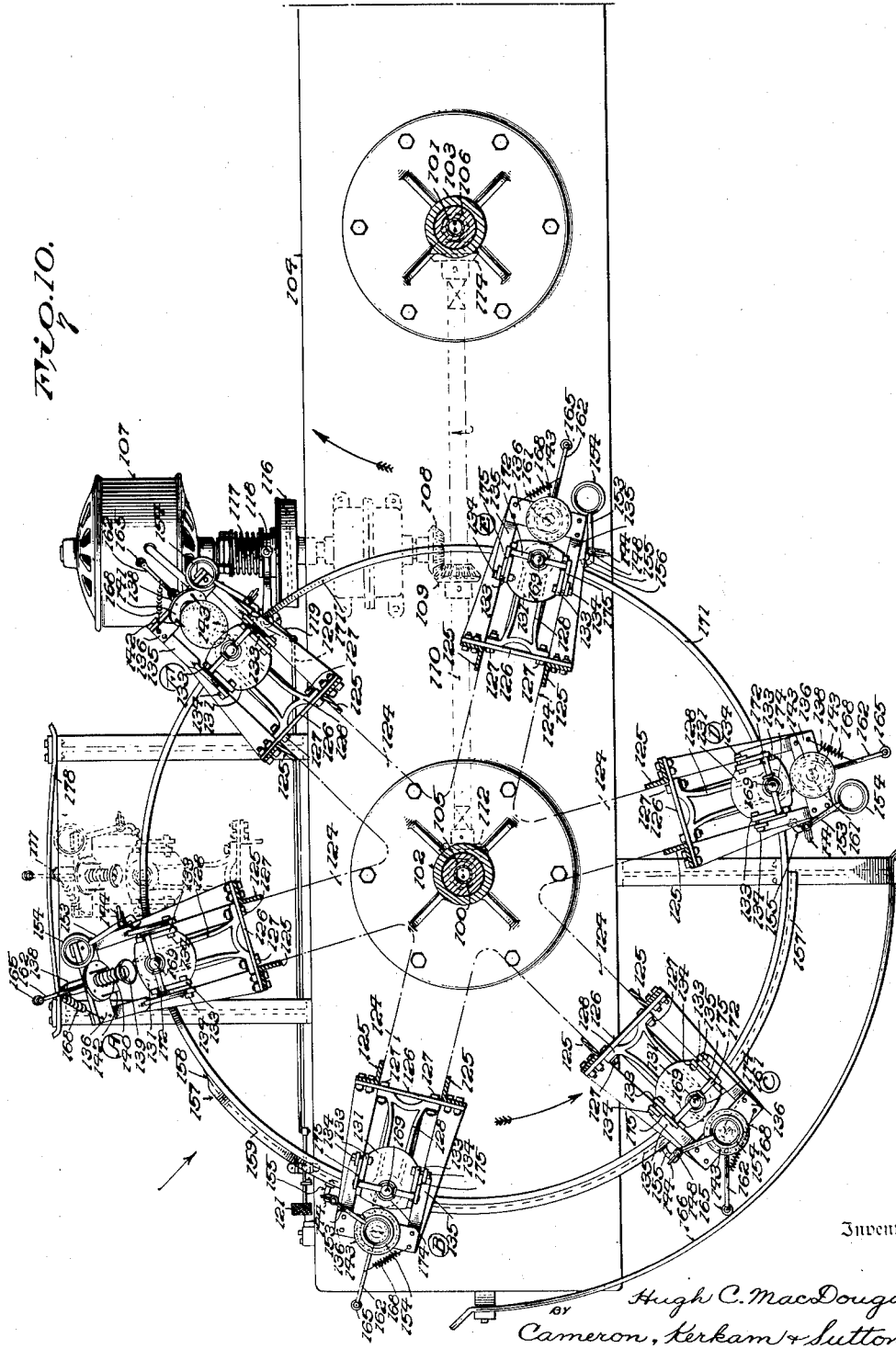

March 20, 1934.    H. C. MacDOUGALL    1,951,804
PARING DEVICE
Filed Oct. 28, 1930    8 Sheets-Sheet 8
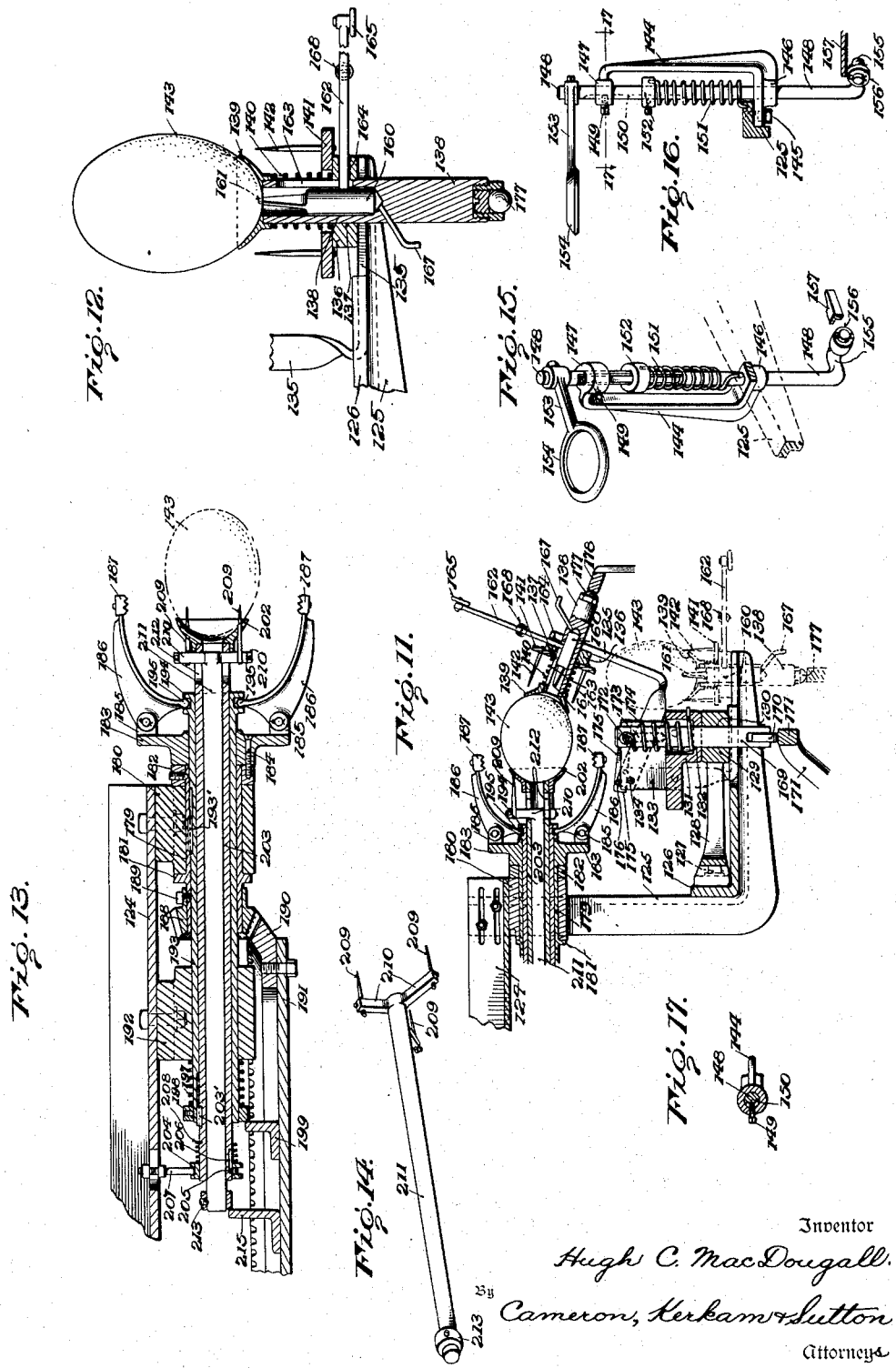

Patented Mar. 20, 1934

1,951,804

UNITED STATES PATENT OFFICE

1,951,804

PARING DEVICE

Hugh C. MacDougall, West New York, N. J., assignor to General Foods Corporation, New York, N. Y., a corporation of Delaware Application October 28, 1930, Serial No. 491,782

48 Claims. (Cl. 146—7)

This invention relates to paring devices and more particularly to power operated devices whereby an object may be pared mechanically instead of by hand.

The invention is more particularly adapted for the removal of the outer skin of coconuts and the like, and will be described as embodied in a machine for paring coconuts, although it is not limited to this use. After the hard outer shell of a coconut has been removed, the meat of the nut is covered with a tough, relatively thin outer skin which must be removed in preparing the nut meat for commercial purposes. Various mechanical devices have been proposed heretofore for paring coconuts and the like which in general have comprised paring knives of various types, but such devices have been unsatisfactory for practical purposes for various reasons. For example, a paring knife is impracticable for paring coconuts because the strong pressure of the blade against the nut results in tearing and breaking up nuts that are cracked or deformed. Moreover, parings removed by a paring knife are thicker than is desirable, and they also stick in the knife and cause it to ride or jump over parts of the surface of the nut.

One of the objects of the invention is to provide novel means for paring a relatively fragile article such as a coconut or the like whereby the pressure of the paring means against the article is reduced and maintained within limits such that breaking, cracking, tearing and the like are eliminated in practical operation.

Another object of the invention is to provide novel means for paring a coconut or the like which is efficient and reliable in operation and practicable for use in paring such objects for commercial purposes.

Another object is to provide novel paring means which may be employed practically for paring a coconut or similar object that is irregular in shape or cracked, without breaking or tearing the object to be pared.

A further object is to provide novel paring means which remove only the outer coating or skin of an object with as little of the useful substance of the object as possible, whether the object is regular in shape or irregular or cracked, etc.

A still further object is to provide paring means having a very small area of contact with the object being pared, to take care of irregularities and inequalities in the surface of the object.

Another object is to provide novel means to control the depth of penetration of the paring means into the surface of an object being pared.

The invention may be embodied in paring machines of the type wherein suitable nut holding and rotating mechanisms are combined with the paring means so that a coconut or the like, after delivery to the machine, may be completely pared and discharged therefrom without any manual operation being required. Machines of this general type have been proposed heretofore wherein one end of a coconut or the like is engaged by suitable mechanism which supports and rotates the coconut at one end while the other end thereof is being pared, whereupon the coconut is transferred and supported and rotated by the pared end while the unpared end is being pared. In machines of this kind it has heretofore been proposed to hold the coconut in one position while one-half of it is pared, to then move it to a transfer position, and then to move it to a third position where the other half is pared, and this has required mechanism having intermittent start and stop action. Such machines have proved unsatisfactory in use. The start and stop action places definite limits on the speed of operation and consequently on the output of the machine. Moreover, the jar resulting from the start and stop operation has disturbed and disarranged the timing of the mechanism, so that the product has been imperfectly pared and in many instances has been torn and broken. Still further, in order to speed up such a machine sufficiently to obtain a worthwhile output, the time allowed for paring has been reduced and it has been necessary to move the paring knife over the surface of the coconut very rapidly and with strong pressure, the nut frequently being torn away from the holding mechanism.

It is accordingly another object of the invention to provide an automatic paring machine wherein start and stop operation of the machine is substantially eliminated.

A further object is to provide an automatic paring machine of greater capacity than those heretofore known, and more particularly a paring machine which not only has increased capacity but also provides a considerable period for paring each individual nut.

Another object is to provide a continuously operating paring machine embodying novel transfer mechanism whereby a nut, after one end is pared, is transferred and held by the pared end while the other end is pared.

Other objects include the provision of automatic or semi-automatic means for feeding the nut to the paring machine, automatic means for draining the milk from a coconut, and other novel features which will appear more fully hereinafter.

The invention has been illustrated in the accompanying drawings, showing a novel paring means and also a continuously operating paring machine preferably having said novel paring means embodied therein, but it is to be expressly understood that the drawings are for purposes of illustration only and are not to be construed as a definition of the limits of the invention, reference being had to the appended claims for this purpose.

In said drawings,

Fig. 2 is an elevation, partly in section, of the machine shown in Fig. 1;

Fig. 3 is a sectional detail view showing a part of the coconut or similar object engaged by a paring device;

Fig. 4 is a plan view of the machine shown in Figs. 1 and 2;

Fig. 5 is a perspective detail showing part of the holding mechanism for the object to be pared;

Fig. 6 is a perspective detail of means for operating the paring device;

Fig. 8 is a diagrammatic plan view of the machine shown in Fig. 7 illustrating the various positions of the mechanism during a cycle of operations;

Fig. 9 is a plan view of the paring machine taken on the line 9—9 of Fig. 7;

Fig. 10 is a plan view of the paring machine taken on the line 10—10 of Fig. 7;

Fig. 11 is a detail view of part of the nut loading or delivering mechanism;

Fig. 12 is a detail view showing means for holding and opening the coconut to drain the milk therefrom;

Fig. 13 is a detail sectional view of the nut holding and rotating mechanism;

Fig. 14 is a perspective view of a part of the mechanism of Fig. 13;

Figs. 15 and 16 are detail views of parts of the loading mechanism; and

Fig. 17 is a section on the line 17—17 of Fig. 16.

Figure 1:
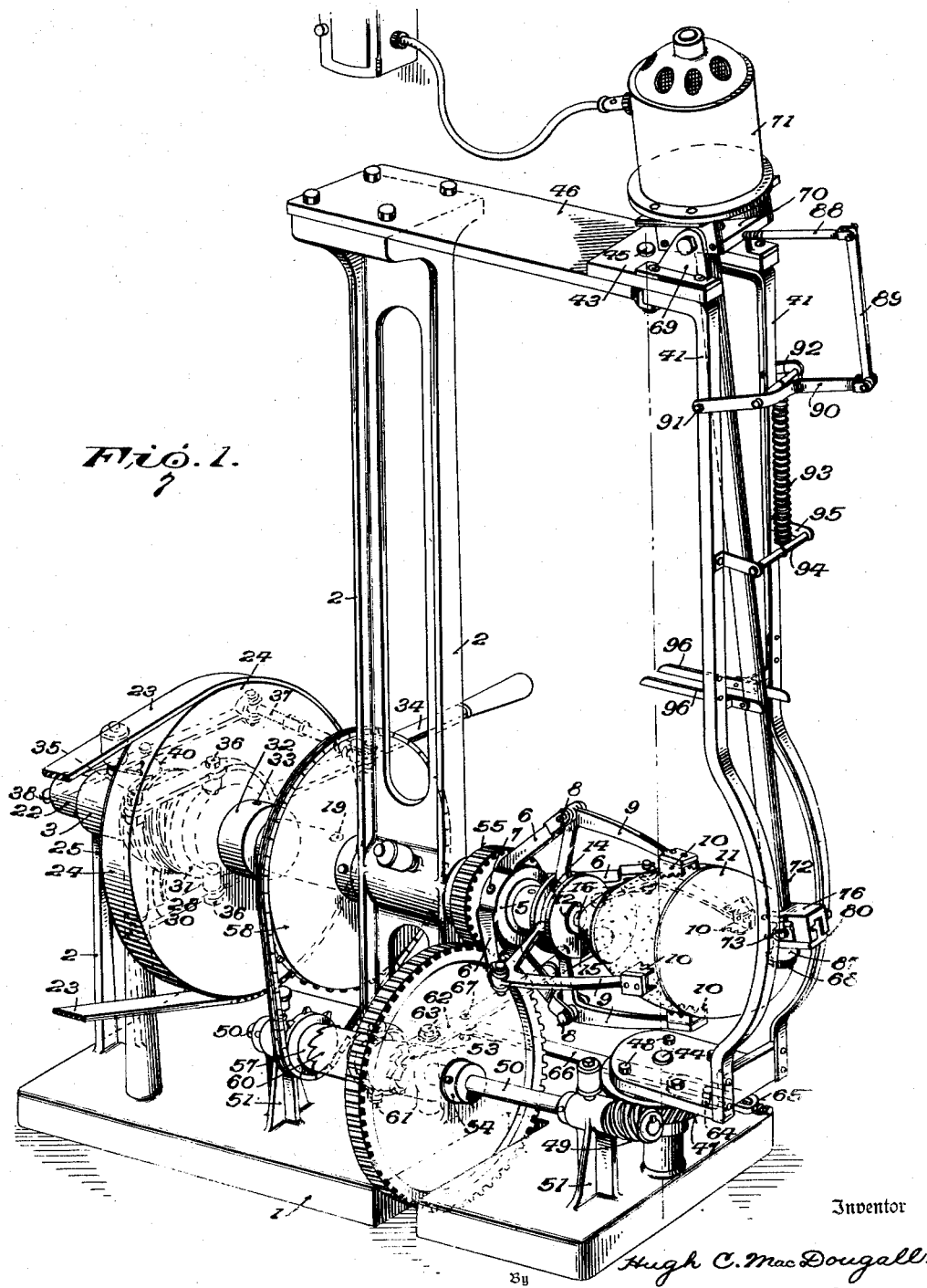
Fig. 1 is a perspective view of a suitable paring machine provided with novel paring means embodying the invention.

Figs. 1 to 6, inclusive, show a paring machine of the type wherein one end of a coconut, for example, is engaged by suitable holding mechanism which supports and rotates the coconut while the other end thereof is being pared. It will be understood, however, that any suitable form of nut holding and rotating mechanism may be employed and further that said mechanism may be embodied in any suitable machine whereby the nut, after delivery to the machine, may be completely pared and discharged therefrom without any manual operations being required.

Referring now to the drawings, the nut holding mechanism as shown in Figs. 1 to 6 is mounted on a suitable base plate 1 provided with uprights 2 in which are formed journal bearings 3. A sleeve 4 rotatably mounted in the bearings 3 carries at one end a ring 5 provided with a plurality of radially extending arms 6, said ring and arms being secured to the sleeve 4 by suitable means such as a screw 7. Pivoted at 8 to the outer ends of the arms 6 are a plurality of L-shaped arms 9, the outer ends of said arms carrying toothed jaws 10 adapted to engage and hold a coconut 11 and the opposite ends of said arms extending radially inward toward the axis of the sleeve 4. A second sleeve 12, that is mounted within the sleeve 4 and is suitably connected thereto for rotation but adapted to slide axially therein, carries on its end a suitable collar 13 provided with a peripheral groove 14 in which the ends of the arms 9 engage.

The sleeves 4 and 12 rotate together, holding and rotating the coconut 11 the inner end of which is preferably centered in a cup 15 mounted on a rod 16 that extends slidably into the sleeve 12 but rotates therewith by virtue of a suitable pin and slot connection 17, said rod preferably seating against a suitable coil spring 18. Preferably, sleeves 4 and 12 are connected for rotation by means of a pin 19 extending through the sleeves, sleeve 12 being provided with suitable slots 20 to provide for axial movement thereof in the sleeve 4. Sleeve 12 is preferably held resiliently in the position shown in the drawings, wherein the jaws 10 clasp the coconut 11, by means of a coil spring 21 within said sleeve which engages at one end the pin 19 and at the other end a cap 22 threaded on the end of said sleeve. The nut holding mechanism may be rotated in any suitable manner as by a belt 23 and a pulley 24 that is mounted loosely on the sleeve 4, one side of said pulley having a conical surface 25 which provides a clutch face cooperating with a clutch disk 26 that is keyed at 27 on the sleeve 4. A coil spring 28 that is interposed between a ring 29 and lock nut 30 threaded on the sleeve 4 and a grooved clutch collar 31 formed on the disk 26 urges said clutch disk resiliently into engagement with the pulley 24 which is prevented from moving longitudinally on the sleeve 4 by collar 32 and set screw 33.

The inner sleeve 12 may be displaced axially in any suitable manner, either automatically or manually, against the tension of the spring 21 to rock the arms 9 about their pivots 8 to release the coconut 11, and preferably the rotation of the nut holding mechanism is stopped at the same time. In the form shown this is accomplished by displacing clutch disk 26 against the action of spring 28 to disengage the clutch faces and simultaneously moving the sleeve 12 axially in the sleeve 4 to disengage the clamping jaws 10 from the coconut. A clutch operating lever 34, suitably pivoted at 35 upon the frame, is provided with pins 36 which engage the grooved clutch collar 31. A link 37 pivotally connects the operating lever 34 with a lever 38 pivoted at 39 upon an arm 40 that is suitably secured to one of the uprights 2, the end of lever 38 engaging the outer end of the sleeve 12. When the operating lever 34 is moved to the left as seen in Fig. 4, the clutch disk 26 is moved longitudinally on the sleeve 4 against the action of spring 28 to disengage the clutch, whereby the rotation of the nut holding mechanism is stopped and simultaneously lever 38 is rotated about its pivot 39 and sleeve 12 moves axially in the sleeve 4 against the tension of the spring 21 to rock the clamping arms 9 about their pivots 8 and release the nut.

While the nut is being held by the rotating jaws 10, it is engaged and pared by a paring device which preferably comprises a small disk rotating at high speed and having peripheral teeth, the disk being urged with a very light resilient pressure, into contact with the surface of the rotating nut and moving from the equator of the nut to the unobstructed or outer pole thereof so that the teeth of the disk mill off the skin from the unobstructed half of the nut. In order to provide for movement of the paring device from the equator to the pole of the nut, it is preferably mounted in a swinging frame which comprises, in the form shown, a pair of spaced parallel bars 41 which at their lower ends are preferably secured to a plate 42 and at their upper ends to a plate 43. Plate 42 is pivoted on a pin 44 mounted in the base 1 and plate 43 is pivotally connected by means of pin 45 to an arm 46 that is secured to one of the standards 2, the axes of pins 44 and 45 being preferably aligned and preferably passing through the approximate center of the nut 11.

The swinging frame is oscillated about the nut by any suitable means which as shown comprise a worm wheel 47 that is secured by means such as screws 48 to the plate 42 and is driven by a worm 49 on a shaft 50 rotatably mounted in suitable bearings formed in standards 51 on the base 1. A gear 52 carrying a clutch jaw 53 and loosely mounted on the shaft 50 is held against longitudinal movement thereon by a collar 54 and meshes with a pinion 55 that is mounted on and keyed to sleeve 4, and a sprocket wheel 56 carrying a clutch jaw 57 and also loosely mounted on shaft 55 is connected by a chain 58 with a sprocket wheel 59 carried by and suitably keyed to the sleeve 4. Either gear 52 or sprocket wheel 56 may be employed to drive the shaft 50 by means of a double ended clutch sleeve 60 suitably splined to shaft 50 and having a groove in which engage pins 61 on an operating lever 62, preferably pivoted at 63 on base 1. When the clutch sleeve 60 engages clutch jaw 57, the shaft 50 will be driven by the sprocket wheel 56 in the same direction as sleeve 4 and when the clutch sleeve 60 engages clutch jaw 53, the shaft 50 will be driven by gear 52 in a direction opposite to that of sleeve 4. Thus clutch sleeve 60 may be operated to drive the worm wheel 47, the frame carrying the cutting disk swinging in one direction while the paring device travels from the equator to the pole of the coconut and swinging in the reverse direction to return the paring device to its starting position. Preferably the clutch sleeve 60 is operated automatically by means of a depending pin 64 on the worm wheel 47 that engages a suitable slot 65 formed in the end of a lever 66 that is secured at 67 to the lever 62. As the pin 64 reaches the end of the slot 65, lever 62 is moved in one direction or the other to shift the clutch sleeve 60. Lever 62 is also manually operable.

A paring device comprises a small toothed disk 68 that is carried by the swinging frame above described, means being provided for rotating the cutting disk 68 at high speed and for resiliently urging it into contact with the surface of the coconut 11. In the form shown, the plate 43 of the swinging frame carries a pair of upwardly extending lugs 69 between which is pivoted a bracket 70 which carries a high speed electric motor 71. An opening is cut through the bracket 70 in alignment with the motor shaft and in said opening is threaded a tube 72 housing a shaft 73 that carries the cutting disk 68 and is connected by means of a suitable coupling device 74 with the motor shaft, bushings 75 at the upper and lower ends of the tube 72 providing bearings for said shaft 73.

Secured to the lower end of the tube 72, from which the shaft 73 projects, is a cutter guard device which comprises a portion secured to the tube 72 and a portion slidable on said first portion at right angles to the shaft and carrying a guard to determine the depth of penetration of the cutting device into the surface of the coconut. In the form shown, a block 76 is provided with a ring 77 surrounding the end of tube 72 and secured thereon by a set screw 78. The block 76 is provided with a slot or groove in which slides a lug 79 formed on a block 80, and the side of the slot in block 76 is grooved to receive a rib 81 projecting laterally from the lug 79 of block 80. A set screw 82 locks the block 80 in any desired position relative to block 76. A ring 83 formed on block 80 extends loosely around the shaft 73 and a bushing 84 is secured in said ring 83 by suitable means such as a set screw 85, said bushing having an interior diameter larger than the diameter of shaft 73 so as to permit movement of block 80 relative to the shaft. A flange 86 on the lower end of bushing 84 forms a support for a guard roller 87, the outer diameter of which is preferably slightly greater than the greatest diameter of the teeth of cutting disk 68. By adjusting the block 80 relative to block 76, roller 87 may be positioned eccentrically with respect to cutting disk 68 so as to leave the tips of the cutting teeth on the side of the shaft next the coconut unmasked sufficiently to cut into the coconut to the desired depth of penetration, while the remaining teeth of the cutting disk are entirely masked or covered.

Suitable means are likewise provided for urging the cutting disk 68 into contact with the surface of the coconut, said means preferably tending to swing the assembly of bracket 70, motor 71, tube 72, shaft 73 and cutting disk 68 about the pivotal axis of bracket 70 in the ears 69. In the form shown, a short rod 88 is threaded in the bracket 70 and is pivotally connected by means of a link 89 with a forked arm 90 pivoted at 91 to the swinging frame. A pin 92 extends between the forks of arm 90 and a tension spring 93 connects pin 92 with a pin 94 that is mounted by brackets 95 on the swinging frame. Spring 93 tends to pull arm 90 downward and the latter, acting through link 89 and rod 88, tends to swing bracket 70 about its pivot in ears 69 and urges the cutting disk 68 inwardly about the axis of the swinging frame, the movement of the tube 72 being preferably guided by a pair of guide arms 96 secured to the arms 41. Since the point of attachment of link 89 to arm 90 is at a greater distance from pivot 91 than the point of attachment of the spring 93 to arm 90, spring 93 may be made fairly strong and yet cause only a very light pressure of the cutting disk on the coconut, and at the same time the cutting disk may have substantial radial movement without material variation of the light resilient pressure of the cutting disk on the coconut.

The operation is as follows. The motor 71 is energized and the shaft 73 and cutting disk 68 are driven at a high speed. For paring coconuts, speeds in the neighborhood of 8,000 R. P. M. give good results, while excellent results have also been obtained with higher speeds which may be as great as 25,000 R. P. M. It will be understood that the cutter guard is properly adjusted to limit the depth of penetration of the cutting teeth into the surface of the coconut. With power applied to the pulley 24 through the drive belt 23, the operating lever 34 is moved to the left as seen in Fig. 4 whereby the clutch 25, 26 is disengaged and the nut holding mechanism remains stationary. At the same time lever 38 is moved to displace sleeve 12 longitudinally within the sleeve 4 thereby rocking the arms 9 and opening the clamping jaws 10. The swinging frame being in the starting position as shown in full lines in Fig. 4, the cutter is held back out of the way, preferably by hand, and one end of a coconut is pushed into the cup 15, displacing the rod 16 inwardly in sleeve 12, whereupon the operating lever 34 is released, spring 21 moves the sleeve 12 longitudinally in the sleeve 4 and closes the clamping jaws 10 on the coconut, and spring 28 engages the clutch 25, 26. The nut holding mechanism and the coconut 11 then rotate at a speed which is preferably somewhat greater than 100 R. P. M., say 110 R. P. M.

As the sleeve 4 rotates, sprocket wheel 56 on the shaft 50 is driven by chain 58 and sprocket wheel 59, and gear 52 on the shaft 50 is driven by gear 55. With the swinging frame in the starting position lever 62 is positioned to engage the clutch sleeve 60 with the clutch jaw 57 and the shaft 50 is rotated in the proper direction to cause the cutter, which has now been released and is resiliently urged against the coconut by spring 93, to travel slowly around the coconut from its equator to the pole thereof, as shown in dotted lines in Fig. 4.

One-half of the coconut having been pared by this operation, pin 64 engages the end of slot 65 and moves the lever 62 from the position shown in Fig. 4, causing the clutch sleeve 60 to disengage clutch jaw 57 and to engage clutch jaw 53, whereby shaft 50 is rotated to cause the swinging frame and cutter to return slowly from normal position to starting position, the cutter being preferably held out of contact with the nut during its return movement. As the cutter reaches the starting position, lever 62 is again shifted to shift the clutch sleeve 60 and to return the apparatus for another paring operation, while at the same time lever 34 is again moved to disconnect the drive from the nut holding mechanism and from the swinging frame and to release the clamping jaws 10. The nut 11 may now be turned around and its other end inserted in the clamping jaws, or another coconut may be placed in said jaws, the operation continuing as above described.

The cutter 68 is resiliently pressed lightly but firmly against the surface of the coconut, and the pressure does not vary materially regardless of the radial position of the cutter, owing to the construction of the resilient means as explained above. The cutter rotates at high speed in contact with the surface of the coconut and effectively mills or pares off the skin, the depth of the cut being suitably predetermined by means of the cutter guard so that a very small part of the surface of the nut is removed. Owing to the fact that the cutter contacts with the surface of the nut over a very small area, and owing to the steady but light resilient pressure of the cutter on the nut, it is enabled to follow the surface closely. The cutter will go into depressions and ride over raised portions of the surface, paring the whole surface cleanly to a uniform depth regardless of irregularities of the surface. These advantages are obtained with only a very light pressure against the nut and with substantially no component of this pressure tangential to the surface of the nut, accordingly the pressure of the cutter does not interfere with the grip of the holding mechanism on the nut, does not tear the nut away from the jaws, and there is no tendency for the cutter to shave off bumps on the surface or engage cracks in the meat so as to tear up and destroy the nut. Parings removed by the cutter are very light and very little meat is wasted, as is the case when the nuts are pared by knives, either by hand or mechanically, and moreover, the parings contain so little meat that they are substantially dry and may be pressed or otherwise treated to obtain oils therefrom without preliminary drying that is required in the case of knife parings.

Figs. 7 to 17, inclusive, illustrate a continuously operating paring machine of the type wherein a coconut or the like fed to the machine will be completely pared and delivered from the machine, which preferably embodies paring means of the type described above in connection with Figs. 1 to 6, inclusive. In its preferred form this machine embodies a pair of continuously rotating turrets each of which embodies a plurality of means for holding and rotating a coconut and a paring means associated with each nut holding and rotating means. The turrets, which as shown, rotate on parallel vertical axes and in substantially the same horizontal plane, are adjacent and are provided with means whereby the nuts, after having one end pared in one turret, are automatically transferred to the other turret without stopping the rotation of the turrets and then have their other ends pared in the second turret.

Preferably the nuts are fed to the first turret in a plane below the horizontal plane of the paring and transferring operations and are carried in this lower plane through substantially a revolution of the turret while they are opened to permit the milk to drain out. The nuts may then be elevated by suitable automatic mechanism to a higher plane where they are engaged by the holding and rotating mechanisms and are pared during a second revolution of the first turret, and are then transferred to the second turret and pared and discharged during its revolution. This complete cycle of operation will be more clearly understood by following the dot and dash lines in Fig. 8.

Referring now to the drawings, the turrets are preferably rotatably mounted on a pair of substantially parallel vertical standards 100 and 101 which as shown extend upwardly through suitable bearing sleeves or the like 102 and 103 that are secured in any suitable manner to a stationary table 104. Surrounding the standards 100 and 101 are sleeves 105 and 106 which rotate on said standards and within the sleeves 102 and 103. As shown, the sleeves 105, 106 are driven from an electric motor 107 having on its shaft a bevel gear 108 meshing with a bevel gear 109 on a shaft 110, the latter being carried in bearing brackets 111 on the table 104 and having on one end a bevel gear 112 meshing with a bevel gear 113 on the sleeve 105 and on the other end a bevel gear 114 meshing with a bevel gear 115 on the sleeve 106. It will be seen that sleeves 105 and 106 are rotated by motor 107 in opposite directions, the mechanism driven by sleeve 105 being assumed to rotate in a counter-clockwise direction and the mechanism driven by sleeve 106 in a clockwise direction. Preferably a friction clutch 116 is interposed between the motor 107 and bevel gear 108, the clutch parts being normally engaged by a coil spring 117 but being separated to stop the machine by the arm 118 of a bell crank lever, the other arm 119 of which is connected by a link 150

120 with a suitable foot pedal 121 preferably located at the loading position of the machine.

The sleeves 105 and 106 preferably carry and drive all of the rotating mechanism of the two turrets, said sleeves being supported vertically on suitable bearings which as shown are constituted by engagement of enlargements 122 and 123 of said driving sleeves with the upper ends of bearing sleeves 102 and 103. To this end each of the sleeves 105 and 106 carries a support 124, either in the form of a disk or in the form of a plurality of radiating arms. Supports 124 each carries a plurality of nut holding and rotating devices to be described in detail hereinafter, and support 124 of the first or left-hand turret, as viewed in Fig. 7, also carries loading mechanisms and means for opening and draining the coconut which mechanisms and means rotate in a plane below the plane of rotation of the nut holding and rotating mechanisms. It is to be expressly understood, however, that the specific form of supports 124 and the supporting and driving sleeves 105 and 106, etc., constitutes no part per se of the present invention and any suitable form may be employed.

Figure 7:
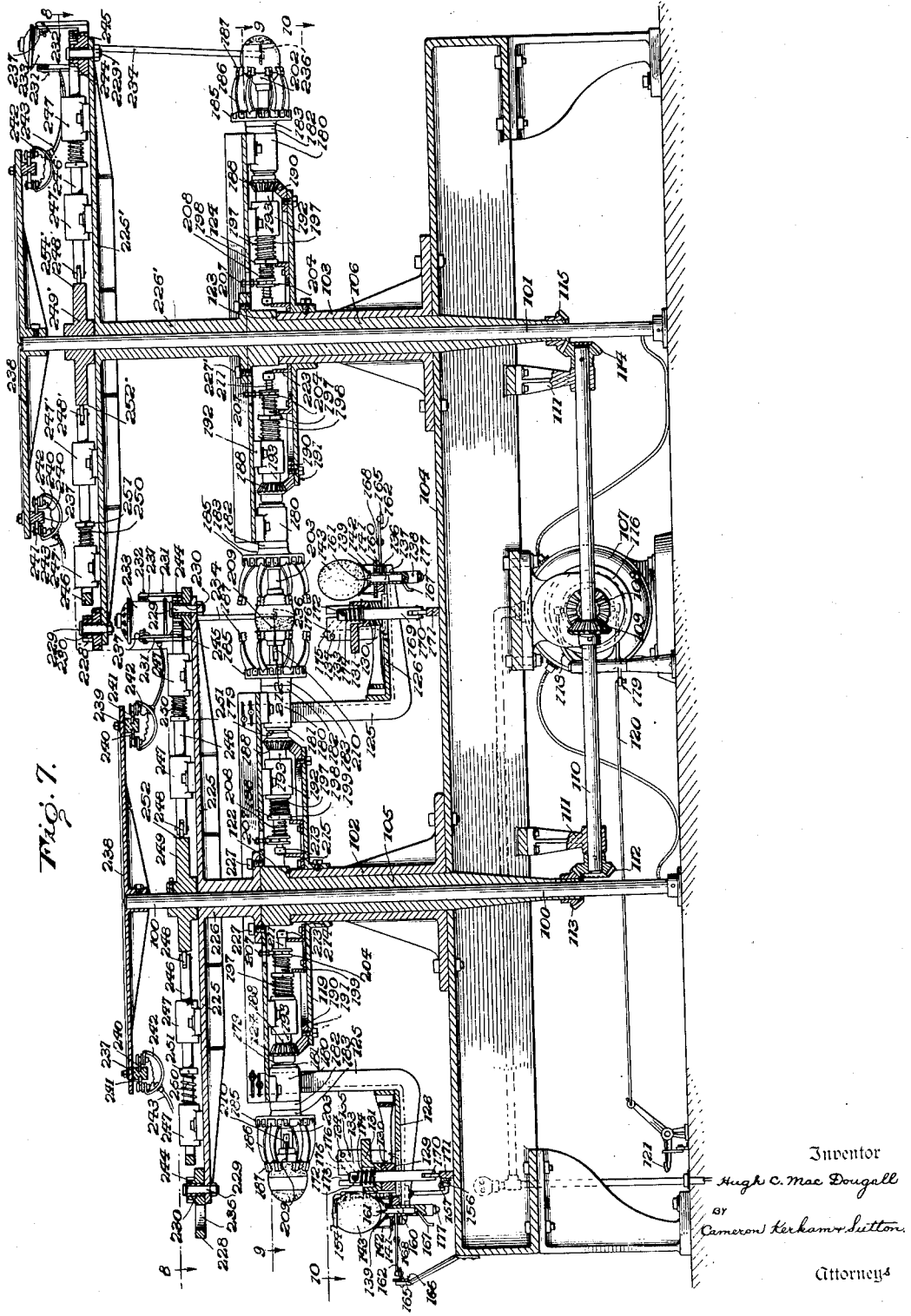
Fig. 7 is an elevation partly in section of a continuously operating automatic paring machine.

Fig. 8 indicates the position at which the machine is loaded, and here the coconuts are placed manually one by one on a plurality of rotating loading mechanisms, one loading mechanism being preferably associated with each nut holding and rotating mechanism to be described hereafter. As shown in the drawings, the turrets are each provided with six holding and rotating mechanisms, and accordingly the first turret is provided with six loading mechanisms as shown in plan in Fig. 10. As shown, the loading mechanisms are supported on supports formed by angle irons 125 which depend from the supports 124 and are curved to extend substantially horizontally below the supports 124 as seen in Fig. 7.

Each loading mechanism preferably embodies means on which a nut is placed lightly by hand and means automatically operable as the loading mechanisms are revolved by sleeve 105 to hold the nut tightly in place, to open the nut to drain out the milk, and to raise the nut to the horizontal plane of the support 124 and to transfer it to a holding and rotating mechanism for the paring operation, but it will be understood that the loading mechanisms may be modified as desired to omit one or more of these functions.

One of these loading mechanisms will now be described in detail, with particular reference to Figs. 7, 10, 11 and 12. An angle plate 126 suitably secured to the angle iron 125 constitutes a supporting table for the loading mechanism and to this plate is suitably secured, as by bolts and nuts 127, a bracket 128 having at its outer end a block 129 (Fig. 11) provided with a central bore 130. Mounted on the block 129 is a cup-shaped member 131 having an opening 132 aligned with bore 130, and secured to opposite sides of member 131 are upwardly extending plates 133. Pivoted at 134 to each of plates 133 is a bar 135, said bars extending downwardly to about the level of plate 126 and being then turned to extend outwardly in a substantially horizontal plane. The outer ends of bars 135 are connected by a plate or block 136 (Fig. 12) having an opening 137 through which extends a sleeve 138. The upper end of sleeve 138 carries a suitable cup 139 and is normally urged resiliently upwardly into the position shown in Fig. 12 by suitable means such as a light coil spring 140. A plate 141 suitably secured to block 136 is provided with a plurality of upwardly extending pins 142 which surround the sleeve 138 and cup 139.

Sleeve 138 and cup 139 are in the position shown in Fig. 12 when the loading mechanism reaches loading position, and the operator lightly places a coconut 143 in the cup 139. When the coconut is forced downwardly, pins 142 penetrate and hold the nut firmly in position, but in order to eliminate danger of injury to the operator, suitable means are preferably provided whereby this is accomplished automatically as the loading mechanism is revolved away from loading position. Referring to Figs. 15 and 16, a bracket 144, secured to one of the angle irons 125 in any suitable manner as by a bolt or screw 145, is provided with two aligned bosses 146 and 147 through which a rod 148 is slidable and is also capable of rotation that is limited by engagement of a screw 149 in a slot 150 in said rod (Fig. 17). A coil spring 151 is interposed between angle iron 125 and a collar 152 secured to rod 148, the opposite ends of said spring being secured to said angle iron and collar respectively so that the spring tends to rotate rod 148 and also to hold it upwardly. The upper end of rod 148 carries an arm 153 having at its end a ring 154, and the lower end of rod 148 is provided with an angular extension 155 carrying a roller 156 adapted to engage a cam track 157 as the loading mechanism leaves loading position. As roller 156 first engages cam track 157, it is cammed outwardly by the inclined surface 158 (Fig. 10), swinging the ring 154 into position over the top of the coconut which the operator has just placed lightly in cup 139, and said roller then engages under the edge of a downwardly inclined portion 159 of said cam track whereby rod 148 is pulled downwardly and ring 154 engages the top of the coconut, depresses cup 139 and sleeve 138 against the tension of spring 140, and engages the coconut on pins 142. The cam track 157 subsequently permits rod 148 to rise under the influence of spring 151 so as to remove ring 154 from the coconut, and as the roller 156 runs off the end of the cam track, spring 151 also rotates rod 148 to swing arm 153 and ring 154 to one side so that it is out of the way for subsequent operation. Preferably spring 140 is not strong enough to lift the coconut 143 off of pins 142.

With the coconut firmly held by pins 142, and as the loading mechanism revolves, means are provided for opening the coconut to drain out its milk. Preferably the jamming down of the coconut on pins 142 also serves to jam the coconut on a knife which may then be twisted by suitable means so as to make a sufficient opening to permit the milk to run out, said knife having a thin blade so that when withdrawn the opening in the coconut will close up. In the form shown, sleeve 138 (Fig. 12) houses a member 160 which is provided with an upwardly extending knife blade 161. A rod 162 is secured to member 160 and extends through a slot 163 in the wall of sleeve 138, so that sleeve 138 may move vertically with respect to member 160 while the latter is held against vertical movement due to the fact that rod 162 extends through a slot 164 in plate 136. When the coconut is jammed down by the ring 154 and sleeve 138 is displaced downwardly, member 160 is held against downward movement and as a result the knife blade 161 is inserted in the coconut. Also when sleeve 138 is in its upper position shown in Fig. 12, the engagement of rod 162 with the bottom of slot 163 limits the upward movement of the sleeve.

Means are provided for twisting the knife 161 in the coconut as above described, and preferably, this is accomplished by swinging rod 162, slot 164 having sufficient angular width to permit this. As shown, rod 162 is provided on its outer end with a roller 165 which engages a cam track 166 (Fig. 10) as the loading mechanism moves away from loading position and after the nut has been jammed down on pins 142, said cam track swinging the rod to twist knife blade 161 in a clockwise direction. This twisting of the thin knife blade spreads the opening in the coconut and allows the milk to drain out into suitable receptacles, a drain 167 being preferably provided for the interior of the sleeve 138, and as soon as roller 165 leaves the end of cam track 166, the knife is returned to its original position by suitable means such as a coil spring 168 (Fig. 10) connected between the rod 162 and plate 136.

The loading mechanism continues to revolve and before it reaches loading position to receive a second coconut, suitable means are provided for elevating the coconut to the plane of the support 124 where it is received by a nut holding and rotating mechanism. Preferably this is accomplished by swinging the bars 135 about their pivots 134 to a position as shown in Fig. 11. To this end, a rod 169 extends through bore 130 in block 129 and opening 132 in member 131, said rod being provided at its lower end with a roller 170 which engages a cam track 171. A cross pin 172 extends through the top of rod 169 and slidably engages in slots 173 in plates 133 to guide the rod 169 in its vertical movement. Preferably a coil spring 174 surrounds the rod 169 and is secured to the pins 172 and to the bottom of cup-shaped member 131, said spring tending to hold said rod in its lowermost position. To the ends of pin 172 which extend through the slots 173 are pivoted links 175 which are pivoted at their other ends at 176 to bars 135, pivots 176 being slightly above and outwardly of pivots 134. When the rod 169 is in its normal position as shown in Fig. 7, links 175 extend downwardly and outwardly from pivots 176 to the pin 172. As the loading mechanism revolves, roller 170 rides on the cam track 171 until it reaches point 171' (Fig. 10) where the cam track is inclined upwardly as shown in Fig. 11. Rod 169 is now quickly lifted, and the outer ends of links 175 are carried vertically upward by pin 172 sliding in slots 173, with the result that links 175 constitute a lever acting on bars 135 at points 176 to swing said bars 135 about their pivots 134 to the position shown in Fig. 11. This raises the coconut to position to be delivered to the nut holding and rotating mechanism.

Preferably means are provided for delivering the coconut to the nut holding and rotating mechanism when in its raised position. As shown, the lower end of sleeve 138 carries a ball 177 which engages a cam track 178 that pushes sleeve 138 through the block 136 to raise the coconut 143 off of pins 142 and pushes the coconut outwardly to the holding and rotating mechanism carried on support 124. As soon as the nut is released, cam track 171 permits rod 169 to drop due to the weight of arms 135 and mechanism carried thereby, and the tension of spring 174, the loading mechanism immediately returning to normal position ready for the next nut to be placed in cup 139 by the operator. Ball 177 also rides off cam 178, but sleeve 138 and cup 139 remain in elevated position to receive another nut due to the spring 140.

It will be understood that each loading mechanism carries a coconut so that six coconuts are being carried through the above cycle of operations at one time, a new coconut being added as soon as one has been delivered to a nut holding and rotating mechanism. The support 124 carries a similar number of holding and rotating mechanisms, each receiving a coconut from its associated loading mechanism as explained above, carrying the coconut around while paring one end thereof, transferring it to the second turret, and then receiving another coconut from its loading mechanism. A suitable form of this holding and rotating mechanism is shown in detail in Fig. 13, and embodies a continuously rotating means adapted to grip and rotate the coconut and then to release the same, and means slidable with respect to said rotating means for operating the gripping jaws and for advancing the coconut when the jaws open for transferring it to the second turret. As shown, said rotating means comprises a sleeve 179 rotatably mounted in a bearing 180 secured to support 124, said sleeve having a shoulder 181 at one end of said bearing and a collar 182 at the other end thereof so that it is locked against axial displacement. A plate 183, secured to the assembly of sleeve 179 and collar 182 in any suitable manner, as by a screw or screws 184, is provided with a plurality of ears 185 constituting pivots for arms 186 carrying at their outer ends jaws 187 for gripping, holding adn rotating a coconut. The sleeve and jaws may be rotated in any suitable manner, and as shown, a bevel gear 188 secured to the inner end of said sleeve 179 by suitable means such as a screw 189, meshes with a stationary bevel gear constituted by a toothed ring 190 secured to a plate 191 that is carried by the stationary bearing sleeve 102.

Extending slidably within sleeve 179 and within a bearing 192 secured to support 124 is a sleeve 193, keyed at 193' to sleeve 179 and provided at its outer end with a grooved collar 194 in which engage the ends 195 of arms 186. Suitable resilient means, such as a coil spring 197, is interposed between a collar 198 on the inner end of the sleeve 193 and the bearing 192, to urge said sleeve to the left as viewed in Fig. 13, thus tending to close jaws 187 on the coconut, keyway 193' being extended to permit such movement. Jaws 187 are opened against the spring 197 at proper times by means such as a cam 199 engaging collar 198, said cam being preferably mounted on stationary plate 191. Just as the holding and rotating mechanism revolves past the point at which a coconut is raised by the loading mechanism, a depression 200 on cam 199 (Fig. 9) permits spring 197 to snap the jaws 187 closed to grip and rotate the coconut. The coconut is held in the jaws during approximately half a revolution while it is being pared as described hereafter, and then a rise 201 on cam 199 forces jaws 187 open to release the coconut. It will be understood that each of the six nut holding and rotating mechanisms operates in the same manner.

When the coconut is raised by the loading mechanism and is ready to be gripped by jaws 187, the end of the coconut is received and centered in a cup 202 (Fig. 13) on the end of a sleeve 203 slidable within the sleeve 193 and keyed thereto at 203'. Preferably sleeve 203 is capable of limited axial movement which is resiliently controlled to accommodate nuts of different sizes, keyway 203' being extended for this purpose. To this end a collar 204 is slidably mounted on the inner end of sleeve 203 which extends out of sleeve 193, said collar having a pin 205 engaging a slot 206 in the sleeve 203 and being held against axial movement by means such as a stud 207 secured to the support 124 and engaging a groove in said collar. The sleeve 203 is thus capable of axial movement which is limited by stud 207, collar 204 and pin 205 engaging in slot 206, and a coil spring 208 secured at one end to the sleeve and bearing at its other end against collar 204 tends to maintain the sleeve 203 in its outermost position as shown in Fig. 9. The limited resiliently opposed movement of the sleeve takes care of variations in size of the coconuts delivered by the loading mechanism, while the cup 202 receives and centers the ends of the nuts so that they are properly positioned when gripped by jaws 187.

Suitable means are likewise provided for supporting the coconut when the jaws 187 are held open by the high part of cam 199, and in the form shown, pins 209 are employed for this purpose which pins penetrate the end of the coconut which is seated in the cup 202. When a nut is delivered by the loading mechanism to cup 202, however, pins 209 are preferably withdrawn so that the end of the nut can move in the cup to center the nut. As shown, pins 209 are carried on radial arms 210 of a rod 211 (Fig. 14) which is slidable within the sleeve 203, said arms projecting through slots 212 in said sleeve and said pins sliding through suitable openings in cup 202. The axial movement of pins 209 may be effected in any suitable manner, and as shown, the inner end of rod 211 which extends outwardly from the sleeve 203 is provided with a head 213 that engages cam tracks 214 and 215. As shown in Figs. 9 and 13, cam track 215 holds the rod 211 outwardly with pins 209 thrust forwardly as the holding and rotating mechanism passes through transferring position wherein jaws 187 are opened. As the mechanism continues to revolve, head 213 is engaged by the curved end 216 (Fig. 9) of cam track 214 and rod 211 is pulled inwardly to retract the pins 209, this taking place before the end of a coconut is delivered to cup 202 by the loading mechanism. Similarly, before jaws 187 are opened by reason of collar 198 riding over the rise 201 of cam 199, head 213 engages the curved end 217 of cam track 215 so that rod 211 is cammed outwardly to the position shown in Fig. 9 and pins 209 engage and support the coconut as it moves to transferring position.

The second turret embodies a plurality of nut holding and rotating mechanisms which are substantially similar to those of the first turret. On the second turret, jaws 187 are controlled by a cam track 218 (Fig. 9) having a depression 219 to permit jaws 187 to snap closed on the coconut at the transferring position. As the revolution continues, the jaws 187 withdraw the nut from pins 209 and hold and rotate the nut until a rise 220 on cam track 218 is reached, whereupon the jaws are opened and release the nut.

On the second turret, the pins 209 are unnecessary and are accordingly eliminated, and on this turret the rod 211 may carry an ejector 221 (Fig. 9) operated by the high point 222 of a cam 223 to eject the nut from the holding and rotating mechanism when paring has been completed.

Cooperating with each of the nut holding and rotating mechanisms on both turrets is a suitable paring device, preferably of the type described above in connection with Figs. 1 to 6 inclusive. In the form shown, these paring devices are carried on the first turret above the nut holding and rotating mechanisms by suitable means such as a radially extending support or supports 225 having a boss 226 rotating on the standard 100 and suitably secured to the driving sleeve 105 as by means of bolts 227. The same construction may be employed on the second turret, but here boss 226' preferably has greater vertical extent than boss 226, as clearly shown in Fig. 7, so that the radial support 225' of the second turret rotates in a plane above that of the support 225 of the first turret.

Each of the supports 225 and 225' carries six paring devices, as shown in Figs. 7 and 8. Describing one of these paring devices in detail, a swinging frame 228 is pivoted to the support 225 in any suitable manner, as by means of a pivot pin 229 and a bushing 230. The frame 228 is provided with upwardly extending ears or lugs 231 between which extends a pin 232 on which is pivotally mounted an electric motor 233. The shaft 234 of motor 233 extends downwardly through an opening 235 in the frame 228 and carries at its lower end a rotating cutting disk 236 of the type described above. Shaft 234 is capable of swinging movement in a plane radial to the pivot pin 229 by virtue of the pivotal mounting of motor 233 on pivot pin 232, and suitable resilient means such as a coil spring or springs 237 are provided for urging the cutting disk 236 resiliently into contact with a coconut in the holding and rotating mechanism. Current may be supplied to motor 233 in any suitable manner, and as shown, a stationary support 238 extending from the standard 100 carries a ring 239 provided with two conducting rings 240, 241. A suitable trolley device 242, connected with motor 233 by leads 243, runs around on the rings 240, 241 so that the motor 233 is constantly energized. It will be understood that substantially the same means is provided on the second turret.

Preferably the swinging frames 228 are automatically controlled as the turrets revolve so as to cause movement of the paring devices from the equator to the pole of coconuts held in the rotating and holding mechanisms, and then to return the cutters to starting position until after the nut has been transferred to the second turret and a new nut fed to the holding mechanism. In the form shown, frames 228 are each provided with a pinion 244 which meshes with a rack 245 on a rod 246 sliding in bearings 247 on the support 225. The inner end of each rod 246 is provided with a roller 248 which is urged into engagement with a cam 249 (or 249') by suitable resilient means such as a coil spring 250 interposed between one of the bearings 247 and a collar 251 on said rod.

Cams 249 and 249' are stationary, being suitably secured to the standards 100 and 101, and are shaped to provide the desired movement of the swinging frames 228 as explained above. Referring now to the first turret, as each paring device swings through transferring position, its roller 248 rides on the low portion 252 of cam 249, so that its rod 246 has its innermost position and rack 245 has rotated pinion 244 to swing the frame 228 in a counter-clockwise direction to the position shown in Fig. 8 at position F. On the first turret, each paring device is on the side of its support 225 in the direction of revolution of the turret, and when any one of the rods 246 is fully retracted, the shaft 234 of its associated motor engages a cam surface 253 on the side of support 225, whereby shaft 234 is swung outwardly around the pivot pin 232 and is held out of the way of a coconut which is being delivered to the holding and rotating mechanism by the loading mechanism as described above.

As soon as each paring device has been revolved past the position at which a nut is raised by the loading mechanism and delivered to the holding and rotating mechanism, its roller 248 begins to ride over a cam portion 254 of gradually increasing height so that the rod 246 is gradually moved outward against the tension of spring 250. The rack 245 thus gradually rotates pinion 244 and swings the frame 228 in a clockwise direction about its pivot 229, the shaft 234 being moved off cam surface 253 and the cutting disk being then engaged with the surface of the coconut by spring 237. As the frame 228 continues to swing, the rotating cutting disk 236 travels from the equator of the nut to its pole and pares the nut as described in connection with Figs. 1 to 6.

When the nut has been completely pared, roller 248 reaches a depression 255 in the cam surface and rod 246 is forced inwardly by spring 250 thereby swinging frame 228 in a counter-clockwise direction to the side of the support 225 and by virtue of cam surface 253 withdrawing the cutting disk 236 from the coconut. This takes place before the nut reaches transferring position, as clearly shown in Fig. 8.

A substantially similar operation takes place on the second turret. On this turret, however, when the paring mechanism is in inactive position and approaches transferring position, each swinging frame 228' has been rotated about its pivot 229' in a counter-clockwise direction and is on the side of its support 225' opposite to the direction of rotation of the turret. This is shown in Fig. 8, wherein at the transferring position the paring device on support 225 is ahead of or leads its support while the paring device on support 225' is in back of or behind its support and the two do not conflict when passing through transfer position. As clearly shown in Fig. 7, support 225' passes above support 225 in transfer position.

When passing through transfer position, the rollers 248' on support 225' ride over a low portion 252' of the cam, and after passing transfer position, they ride over a portion 254' of gradually increasing height so that the rods 246' are gradually moved outward and supports 223' are swung in a clockwise direction to pare the nut. When the paring has been completed, rollers 248' reach a depression 255' of the cam and rods 246' are resiliently pushed inward to swing frames 228' in a clockwise direction and return the paring devices to inactive position. This takes place before the nut is ejected from the holding and rotating mechanism at the discharge position.

For the purpose of summarizing a complete cycle of operations of the machine from placing a coconut on the cup 139 until the pared coconut is discharged from the machine, the several mechanisms of each turret may be considered as successive positions of a single mechanism, these positions being lettered from A to F for the first turret and from G to L for the second turret. Referring now to Fig. 10, coconuts are loaded into the machine immediately following position A, the operator placing a nut in the cup 139. At position B, ring 154 has been actuated by its cam track 157 to jam the nut down on the pins 142 and knife blade 161. Between positions B and C, rod 162 engages cam track 166 and rotates the knife in the coconut, the knife being held in this position until the end of cam track 166 is reached. During this period the milk drains out of the coconut, and as soon as the loading mechanism reaches the ends of cam tracks 166 and 157, knife 161 is returned to its original position by spring 168 and ring 154 is returned to its original position by spring 151, as shown at position D. The loading mechanism continues to revolve through positions E and F without change, and then cam track 171 swings the loading mechanism upwardly and cam track 178 thrusts the cup 139 upwardly to remove the coconut from pins 142 and deliver it to cup 202, as shown in position A, pins 209 being retracted by cam 214. As seen in Fig. 9, the jaws 187 are closed on the coconut as position A is reached by virtue of the depression 200 of cam track 199, these jaws gripping and rotating the nut through positions A, B and C.

At position A, the paring cutter is at one side of the jaws 187 and is held back by cam surface 253 so that it is out of the way as the coconut is delivered by the loading mechanism to said jaws. From position A through positions B and C, the paring cutter is slowly swung from the equator toward the pole of the nut by cam surface 254, thereby paring one-half the nut.

Paring is completed just before position D is reached, whereupon depression 255 of cam 249 permits the rotating cutter to be swung back to the side of support 225 onto cam 253 where it remains through positions E, F and A. As position D is reached, cam track 215 pushes out pins 209 to engage and support the coconut and at substantially the same time rise 201 of cam 199 opens the jaws 187. Pins 209 and jaws 187 remain in these positions through position E, transfer position, and position F.

Turning now to the second turret, at position G the jaws 187 are held open by cam track 218, and the paring device is swung around to the side of the support 225' with the cutter held out of the way by cam surface 253'. As the turret leaves position G and reaches transfer position, jaws 187 are closed by virtue of the depression 219 of cam 218, and grasping the coconut, withdraw it from the fingers 209. As the turret continues to revolve, the nut is held and rotated by the jaws, and portion 254' of cam 249' slowly swings the cutter from the equator to the pole of the nut. This paring operation takes place through positions H, I, J, and is substantially completed at K. Immediately following position K, depression 255' of cam 249' permits the cutter to be swung back to the side with the cutting disc held out of the way, and rise 220 of cam 218 opens the jaws 187, the cutter and jaws remaining in these positions through positions L and G, as above described. At position L, cam 223 forces ejector 221 outwardly, discharging the nut, this taking place substantially at the time that the jaws 187 are opened.

The machine above described, while carrying out its cycle of operations automatically, is continuous in operation. Heretofore where start and stop mechanisms have been employed, the jerks and jars resulting from such stops have disturbed and disarranged the timing of the various parts with the result that the machine soon pared imperfectly or in many cases tore up and destroyed fragile articles such as coconuts. The continuously operating machine of the present invention eliminates these objects. Moreover, since the machine operates continuously it is adapted for operation at high speed of which the intermittent motion type of machine is not capable. High speed operation provides greater output, and the relatively large period of revolution of the turret which is employed for the paring operation provides sufficient time for good results to be obtained. This high speed operation is aided by the use of the rotating disc cutter which pares the nut effectively without the great pressure against the nut which is required for other paring devices when operating at high speed. As pointed out above, where relatively large pressure is required in order to pare a nut quickly, the paring knife often tears the nut away from the gripping jaws and may also break it up into pieces, particularly if cracked or broken in any way.

There is also provided a means for opening and drawing the milk from the coconut before paring it, so that the machine is made wholly automatic, and means for automatically loading the coconut whereby danger of injury to the operator is avoided. All of these operations are accomplished in a continuously operating machine and it will be understood that the invention includes in addition to its broader aspects the various novel mechanisms employed for handling and treating the nut which mechanisms are suitably adapted for continuous operation.

It is to be expressly understood that the invention is not limited to the embodiments described and illustrated in the drawings, which are for purposes of illustration only, but that it is capable of a variety of mechanical expressions, and that changes may be made in the form, details of construction, and arrangement of the parts without departing from the spirit of the invention. It will also be readily understood that certain features of the invention may be employed and many of the advantages of the invention obtained without the use of all of the features disclosed in the drawings. For instance, the means for draining the coconut could be eliminated where this operation was not desired for any reason. Similarly, the continuously operating machine might employ any other suitable form of paring device capable of accomplishing the desired result, and likewise the paring device itself could be embodied in any other automatic machine for which it is adapted. Many of the advantages of the invention could also be obtained without the use of continuously rotating turrets, since many of the features above described are applicable to other types of machines. Moreover, the invention is not limited to the treatment of coconuts, but is generally applicable to paring any similar objects. Reference is therefore to be had to the appended claims for a definition of the limits of the invention.

What is claimed is:

1. The combination with means for holding and rotating an object to be pared, a rotating shaft, and a cutter having peripheral teeth and carried by said shaft in contact with said object, of a guard roller carried by said shaft adjacent said cutter, the diameter of said roller being slightly greater than the greatest diameter of said cutting teeth, and means for adjusting said guard roller laterally of said shaft relatively to said cutter.

2. The combination with means for holding and rotating an object to be pared, a rotating shaft, and a cutter having peripheral teeth and carried by said shaft in contact with said object, of a block movable with said shaft, a second block slidable on said first block transversely of said shaft, and a guard roller through which said shaft passes loosely, said guard roller being carried by said second block closely adjacent said cutter.

3. A paring machine comprising in combination a pair of continuously rotating turrets, a holding mechanism carried by each of said turrets, means operable during continuous rotation of said turrets for transferring an object to be pared from one of said mechanisms to another, and means carried by each of said turrets and operable during continuous rotation thereof for paring a portion of said object while held by said mechanisms.

4. A paring machine comprising in combination a pair of continuously rotating turrets, a holding and rotating mechanism carried by each of said turrets, means for rotating said mechanisms, means operable during continuous rotation of said turrets for transferring an object to be pared from one of said mechanisms to another, and means carried by each of said turrets and operable during continuous rotation thereof for paring a portion of said object while held and rotated by said mechanisms.

5. A paring machine comprising in combination a pair of continuously rotating turrets, mechanism carried by each of said turrets for holding and rotating an object to be pared and including means for gripping said object, means for rotating said mechanisms, means for disengaging said gripping means on one turret from said object, means for supporting said object while said gripping means are disengaged, means for closing said gripping means on the other turret to grip said object and withdraw it from said supporting means, all of said means being operable during continuous rotation of said turrets, and means carried by each of said turrets for paring portions of said object while held and rotated by said mechanisms.

6. A paring machine comprising a pair of rotating turrets, gripping means on each of said turrets for holding an object to be pared, means operable during rotation of said turrets for disengaging said gripping means on one turret from said object, means for supporting said object during the period of rotation of said one turret in which said gripping means are disengaged, means operable during rotation of said turret for closing said gripping means on the other turret, whereby said object is withdrawn from said supporting means and transferred from one turret to the other during rotation thereof, and means for paring portions of said object while held by said gripping means on each of said turrets.

7. In a paring machine having a pair of continuously rotating turrets, the combination of gripping means on each of said turrets for holding an object to be pared, and means operable during continuous rotation of said turrets for transferring said object from said gripping means on one turret to said gripping means on the other turret.

8. In a paring machine, the combination with a pair of continuously rotating turrets of gripping means on each of said turrets for holding an object to be pared, means operable during rotation of said turrets for disengaging said gripping means on one turret from said object, means including one or more pins for engaging and supporting said object during the period of rotation in which said gripping means are disengaged, and means for closing said gripping means on the other turret to grip said object and withdraw it from said supporting pins.

9. In a paring machine, the combination with a pair of continuously rotating turrets of gripping means on each of said turrets for holding an object to be pared, means operable during rotation of said turrets for disengaging said gripping means on one turret from said object, means including one or more pins for engaging and supporting said object during the period of rotation in which said gripping means are disengaged, cam means for engaging said pins with said object, and means for closing said gripping means on the other turret to grip said object and withdraw it from said supporting pins.

10. In a paring machine, the combination with a pair of continuously rotating turrets of gripping means on each of said turrets for holding an object to be pared, cam means for disengaging said gripping means on one turret from said object at a predetermined point in the rotation of said one turret, means for supporting said object during the period of rotation in which said gripping means are disengaged, and cam means for closing said gripping means on the other turret at a predetermined point in its rotation to grip said object and withdraw it from said supporting means.

11. In a paring machine, the combination with a pair of continuously rotating turrets of gripping means on each of said turrets for holding an object to be pared, cam means for disengaging said gripping means on one turret from said object at a predetermined point in the rotation of said one turret, means including one or more pins for engaging and holding said object during the period of rotation in which said gripping means are disengaged, cam means for engaging said pins with said object, and cam means for closing said gripping means on the other turret at a predetermined point in its rotation to grip said object and withdraw it from said supporting pins.

12. In apparatus of the class described including a rotating turret, a holding mechanism carried thereby for holding an object, said mechanism including gripping means adapted to engage said object, means for opening and closing said gripping means at predetermined points in the rotation of said turret, means for delivering an object to said gripping means at their closing point, means for receiving and centering said object for engagement by said gripping means, means for supporting said object when said gripping means are disengaged, means for advancing said supporting means when said gripping means are opened, and means for withdrawing said supporting means out of the way of said receiving and centering means before said gripping means are closed.

13. In apparatus of the class described including a rotating turret, a holding mechanism carried thereby for holding an object, said mechanism including gripping means for engaging said object, means for opening and closing said gripping means at predetermined points in the rotation of said turret, means for delivering an object to said gripping means at their closing point, a resiliently mounted cup for receiving and centering an object for engagement by said gripping means, one or more pins for supporting said object when released by said gripping means, means for advancing said pins to engage said object when said gripping means are opened, and means for withdrawing said pins before said object is delivered to said cup.

14. In apparatus of the class described including a rotating turret, a holding and rotating mechanism carried thereby for holding and rotating an object, said mechanism comprising a plurality of elements having relative axial movement but constrained to rotate together, gripping jaws carried by one of said elements and comparatively connected to a second element to be opened and closed by axial movement thereof, a resiliently mounted cup for receiving and centering an object delivered to said mechanism, supporting means carried by a third of said elements for supporting said object when said jaws are opened, a rack, gear means on one of said elements and meshing with said rack, and cam members for controlling axial movement of said second and third elements at predetermined points in the rotation of said turret.

15. In apparatus of the class described including a rotating turret, a holding and rotating mechanism carried thereby for holding and rotating an object, said mechanism comprising a plurality of elements having relative axial movement but constrained to rotate together, gripping jaws carried by one of said elements and operatively connected to a second element to be opened and closed by axial movement thereof, a resiliently mounted cup for receiving and centering an object delivered to said mechanism, supporting means carried by a third of said elements for supporting said object when said jaws are opened, means for rotating said elements, and cam members for controlling axial movement of said second and third members, said cam members being arranged to open and close said jaws at predetermined points in the rotation of said turret and to advance said supporting means when said jaws are opened and retract said supporting means before said jaws are closed.

16. In apparatus of the class described including a rotating turret, means carried thereby for holding and rotating an object to be pared, a frame carried by said turret and mounted to swing about an axis passing substantially through said object, a rotating paring device, a motor having a shaft on which said device is carried, said motor and shaft being pivoted on said frame on an axis substantially at right angles to said first named axis, an operating member for swinging said frame, and cam means for controlling movement of said operating member during rotation of said turret.

17. In apparatus of the class described including a rotating turret, the combination of means for holding and rotating an object to be pared, a support mounted for movement about said object, a paring cutter having peripheral teeth and mounted on said support for radial movement with respect to said object, means carried by said support for rotating said cutter on its own axis at high speed, an operating member for said support, and stationary cam means for moving said operating member as said turret rotates.

18. Apparatus of the class described comprising in combination a rotating turret, means for rotating said turret, a plurality of means on said turret for holding coconuts to be pared, means for piercing said coconuts while held by one holding means, means for automatically transferring said coconuts from said one holding means to another holding means, and means for paring said coconuts while held by said other holding means, all of said means being operable during rotation of said turret whereby continuous production is obtained.

19. Apparatus of the class described comprising in combination a rotating turret, means for rotating said turret, a plurality of means on said turret for holding coconuts, said means being carried by said turret in different planes, means for piercing said coconuts while carried by a holding means in one plane, means for transferring said coconuts from a holding means in said one plane to a holding means in another plane, and means for paring said coconuts while held in said other plane, all of said means being operable during rotation of said turret whereby continuous production is obtained.

20. In apparatus of the class described, the combination of a rotating turret, means for rotating said turret, a plurality of means on said turret for holding coconuts, means for piercing said coconuts while held by one holding means, means for transferring said coconuts to a second holding means, means for paring said coconuts while held by said second holding means, and cam means for operating said piercing means, transferring means, and paring means in timed relation as the turret rotates.

21. In apparatus of the class described, the combination of a rotating turret, means for rotating said turret, loading mechanism carried by said turret, said loading mechanism including means for piercing and opening an object held thereby, cam means for operating said piercing and opening means, cam means for elevating said loading mechanism, holding mechanism adapted to receive objects from said loading mechanism, and paring means associated with said holding mechanism.

22. In apparatus of the class described, the combination of a rotating turret, means for rotating said turret, a plurality of loading mechanisms for receiving objects fed one by one to the machine, means associated with each loading mechanism for gripping and holding said objects, means associated with each loading mechanism for piercing and opening said objects, a plurality of holding and paring mechanisms each adapted to receive an object from one of said loading mechanisms, and means for successively transferring objects from said loading mechanisms to said holding and paring mechanisms.

23. In apparatus of the class described, the combination of a rotating turret, means for rotating said turret, a plurality of loading mechanisms for receiving objects fed one by one to the machine, means associated with each loading mechanism for gripping and holding said objects, means associated with each loading mechanism for piercing and opening said objects, a plurality of holding and paring mechanisms each adapted to receive an object from one of said loading mechanisms, means for successively transferring objects from said loading mechanisms to said holding and paring mechanisms, and cam means for operating said gripping and holding means, said piercing and opening means, and said transferring means in timed relation as the turret rotates.

24. In a rotating paring machine of the class described, a loading mechanism comprising a support, a resiliently mounted cup carried by and movable relatively to said support, a clamping member adapted to engage an object supported in said cup and to displace said object and cup, relatively to said support and one or more stationary pins carried by said support on which said object is forced by said clamping member.

25. In a rotating paring machine of the class described, a loading mechanism comprising a support, a resiliently mounted cup carried by and movable relatively to said support, a clamping member adapted to engage an object supported in said cup and to displace said object and cup relatively to said support, one or more stationary pins carried by said support on which said object is forced by said clamping member, and cam means for operating said clamping member.

26. In a rotating paring machine of the class described, a loading mechanism comprising a support, a resiliently mounted cup carried by and movable relatively to said support, a clamping member adapted to engage an object supported in said cup and to displace said object and cup relatively to said support, one or more stationary pins carried by said support on which said object is forced by said clamping member, and means for moving said cup relatively to said pins to disengage said object from said pins.

27. In a rotating paring machine of the class described, a loading mechanism comprising a support, a resiliently mounted cup carried by and movable relatively to said support, a clamping member adapted to engage an object supported in said cup and to displace said object and cup relatively to said support, one or more stationary pins carried by said support on which said object is forced by said clamping member, means for moving said cup relatively to said pins to disengage said object from said pins, and relatively stationary cam means for operating said clamping member and said cup moving means.

28. In apparatus of the class described, the combination of a supporting member, a cup member slidable therethrough, resilient means normally maintaining said cup member in an elevated position with respect to said supporting member, means carried by said cup member adapted to receive an object, means for engaging the top of said object and displacing said object and cup member downwardly relative to said supporting member, and one or more upwardly extending pins carried by said supporting member and adapted to engage an object when so displaced.

29. In a paring machine of the class described, a loading mechanism comprising a receiving member to receive objects fed one by one to the machine, means automatically operable to engage an object supported by said member and clamp it in position, knife means for piercing said object while so clamped in position, and means for twisting said knife means in said object.

30. In a machine of the class described, a loading mechanism comprising a resiliently mounted member for receiving objects fed one by one to the machine, means to displace said member and an object held thereby, and knife means normally shielded by said displaceable member for piercing said object on displacement.

31. In a machine of the class described, a loading mechanism comprising a resiliently mounted member for receiving objects fed one by one to the machine, means to displace said member and an object held thereby, knife means for piercing said object on displacement, and means for twisting said knife means in said object.

32. In a paring machine of the class described, a loading mechanism comprising a receiving member to receive objects fed one by one to the machine, means automatically operable to engage an object supported by said member and clamp it in position, knife means for piercing said object while so clamped in position, means for twisting said knife means in said object, and cam means for operating said clamping means and said twisting means.

33. In a paring machine of the class described, a loading mechanism comprising a receiving member to receive objects fed one by one to the machine, means for clamping an object in said receiving member, means automatically operable to engage an object supported by said member and move it into engagement with said clamping means, means normally shielded by said receiving member to pierce said object on such movement and means for releasing said object from said clamping means and said piercing means.

34. In a paring machine of the class described, a loading mechanism comprising a receiving member to receive objects fed one by one to the machine, means automatically operable to engage an object supported by said member and clamp it in position, knife means for piercing said object while so clamped in position, means for twisting said knife means in said object, and means for releasing said object from said clamping means and knife means.

35. In a paring machine of the class described, a loading mechanism comprising a receiving member to receive objects fed one by one to the machine, means automatically operable to engage an object supported by said member and clamp it in position, knife means for piercing said object while so clamped in position, means for twisting said knife means in said object, means for releasing said object from said clamping means and knife means, and cam means for operating said twisting means and said releasing means.

36. In a machine of the class described, a loading mechanism comprising a resiliently mounted member for receiving objects fed one by one to the machine, means to displace said member and an object held thereby, knife means normally shielded by said displaceable member for piercing said object on displacement, and means for disengaging said object from said knife means.

37. In a machine of the class described, a loading mechanism comprising a resiliently mounted member for receiving objects fed one by one to the machine, means to displace said member and an object held thereby, knife means for piercing said object on displacement, means for twisting said knife means in said object, and means for disengaging said object from said knife means.

38. In a machine of the class described, a loading mechanism comprising a resiliently mounted member for receiving objects fed one by one to the machine, means to displace said member and an object held thereby, knife means for piercing said object on displacement, means for twisting said knife means in said object, means for disengaging said object from said knife means, and cam means for operating said displacing means, twisting means, and disengaging means.

39. In a machine of the class described, the combination of a resiliently mounted member to receive objects fed one by one to the machine, means to displace said member and an object held thereby, means to engage and hold said object on displacement, and knife means normally shielded by said displaceable member for piercing said object on displacement.

40. In a machine of the class described, the combination of a resiliently mounted member to receive objects fed one by one to the machine, means to displace said member and an object held thereby, means to engage and hold said object on displacement, knife means for piercing said object on displacement, and means for twisting said knife means in said object.

41. In a machine of the class described, the combination of a resiliently mounted member to receive objects fed one by one to the machine, means to displace said member and an object held thereby, means to engage and hold said object on displacement, knife means for piercing said object on displacement, means for twisting said knife means in said object, and means for disengaging said object from said holding means and from said knife means.

42. In a machine of the class described, the combination of a resiliently mounted member to receive objects fed one by one to the machine, means to displace said member and an object held thereby, means to engage and hold said object on displacement, knife means for piercing said object on displacement, means for twisting said knife means in said object, means for disengaging said object from said holding means and from said knife means, and cam means for operating said displacing means, twisting means, and disengaging means in timed relation.

43. In a machine of the class described, the combination of a resiliently mounted cup adapted to receive objects fed one by one to the machine, means for displacing said cup and an object held thereby, one or more pins to engage said object when displaced and hold said object and cup in displaced position, a knife for piercing said object when displaced, said knife normally being shielded by said displaceable cup, and means to restore said cup to normal position and to disengage said object from said pins and said knife.

44. In a machine of the class described, the combination of a support, a sleeve slidable therethrough, resilient means normally maintaining said sleeve in a predetermined position relative to said support, a member carried by said sleeve to receive objects fed one by one to said machine, means for displacing said sleeve relative to said support, and a knife within the sleeve for piercing said object when said sleeve is displaced.

45. In a machine of the class described, the combination of a support, a sleeve slidable therethrough, resilient means normally maintaining said sleeve in a predetermined position relative to said support, a member carried by said sleeve to receive objects fed one by one to said machine, means for displacing said sleeve relative to said support, a knife within the sleeve for piercing said object when said sleeve is displaced, and means for twisting said knife in said object.

46. In a machine of the class described, the combination of a supporting member, a sleeve slidable therethrough, resilient means normally maintaining said sleeve in a predetermined position relative to said support, a member carried by said sleeve for receiving objects fed to said machine one by one, means for displacing said sleeve and an object received in said member, one or more pins adapted to engage said object and hold the same in displaced position, a knife within said sleeve for piercing said object when displaced, and means for twisting said knife in said object.

47. In a machine of the class described, the combination of a support, a sleeve slidable therethrough, resilient means normally maintaining said sleeve in a predetermined position relative to said support, a member carried by said sleeve to receive objects fed one by one to said machine means for displacing said sleeve relative to said support, a knife within the sleeve for piercing said object when said sleeve is displaced, means for twisting said knife in said object, and means to restore said sleeve to said predetermined position.

48. In a machine of the class described, the combination of a support, a sleeve slidable therethrough, resilient means normally maintaining said sleeve in a predetermined position relative to said support, a member carried by said sleeve to receive objects fed one by one to said machine, means for displacing said sleeve relative to said support, a knife within the sleeve for piercing said object when said sleeve is displaced, means for twisting said knife in said object, means to restore said sleeve to said predetermined position, and cam members for operating said displacing means, twisting means, and restoring means in timed relation.

HUGH C. MacDOUGALL.